United States Patent [19]
Schmitt et al.

[11] 3,895,703
[45] July 22, 1975

[54] COMBINED STEERING CLUTCH AND BRAKE CONTROL FOR CRAWLER TRACTORS

[75] Inventors: James L. Schmitt; Clarence L. Castle, Jr., both of Washington; Orville E. Kessinger, Jr., Mackinaw, all of Ill.

[73] Assignee: Caterpillar Tractor Co., Peoria, Ill.

[22] Filed: Oct. 26, 1973

[21] Appl. No.: 409,865

[52] U.S. Cl............ 192/13 R; 192/12 C; 192/18 A; 137/625.69
[51] Int. Cl............................. F16d 67/02; E03b
[58] Field of Search.... 192/13 R, 12 C, 18 A, 17 A, 192/13 A; 137/625.48, 625.69; 251/77

[56] References Cited
UNITED STATES PATENTS

| | | | |
|---|---|---|---|
| 2,370,597 | 2/1945 | Wallerstein, Jr. | 192/13 R |
| 2,392,423 | 1/1946 | Stephens | 192/13 R |
| 2,897,787 | 8/1959 | Kivisto et al. | 192/13 R |
| 2,941,639 | 6/1960 | Christenson et al. | 192/13 R |
| 3,080,026 | 3/1963 | Koch | 192/13 R |
| 3,262,467 | 7/1966 | Stacey | 137/625.69 X |
| 3,262,525 | 7/1966 | Ehlke et al. | 192/13 R |
| 3,473,566 | 10/1969 | Peppel | 137/625.69 X |
| 3,494,449 | 2/1970 | Umeda et al. | 192/13 R |
| 3,802,453 | 4/1974 | Fleury | 137/625.69 X |

Primary Examiner—Samuel Scott
Assistant Examiner—Lance W. Chandler
Attorney, Agent, or Firm—Phillips, Moore, Weissenberger Lempio & Strabala

[57] ABSTRACT

A crawler tractor vehicle having steering clutches and associated steering brakes includes a pair of actuator members each movable to sequential positions to sequentially effect disengagement of a steering clutch and then actuation of an associated steering brake. Independent means are included for allowing the steering brake to be actuated without disengagement of the associated clutch.

7 Claims, 5 Drawing Figures

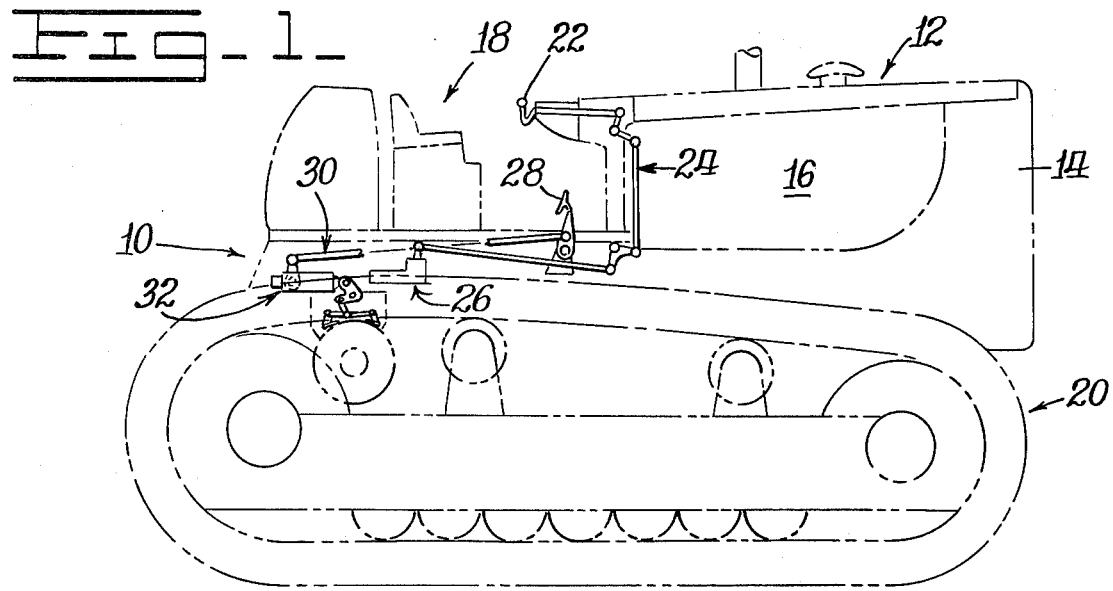
Fig_1_
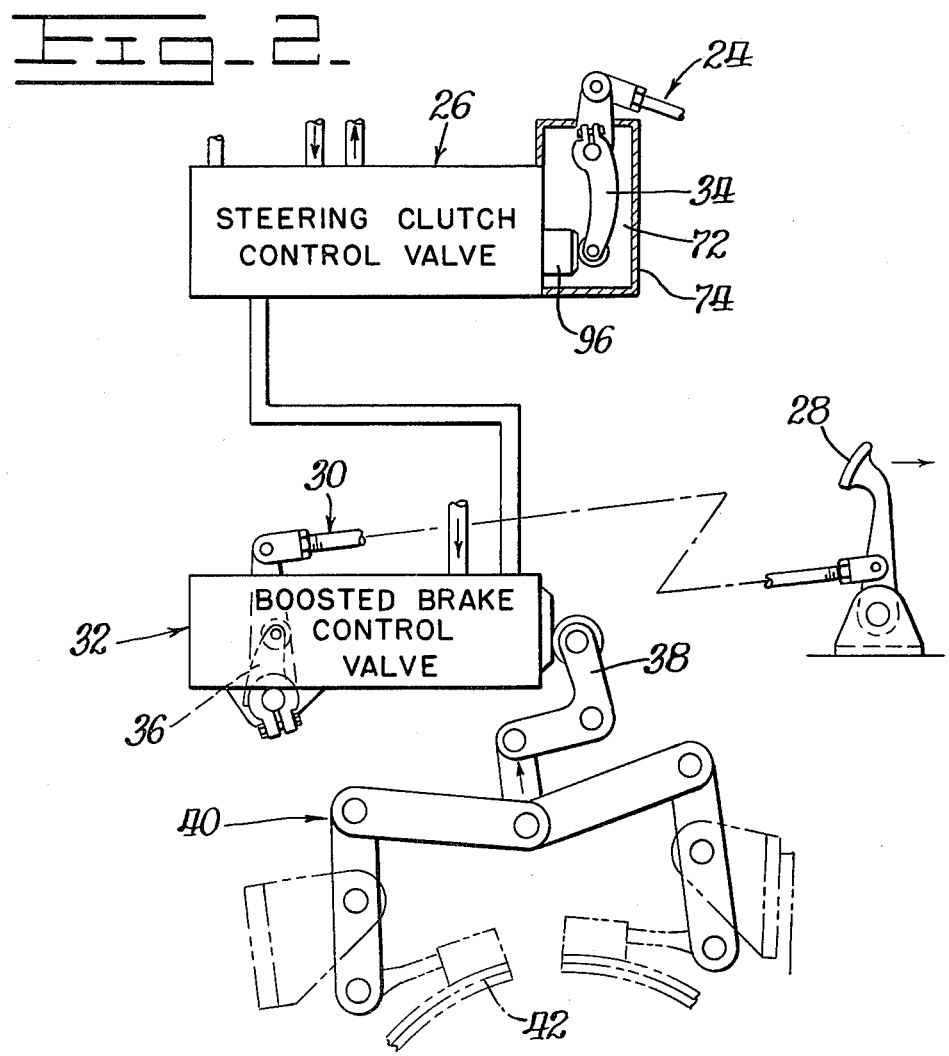
Fig_2_

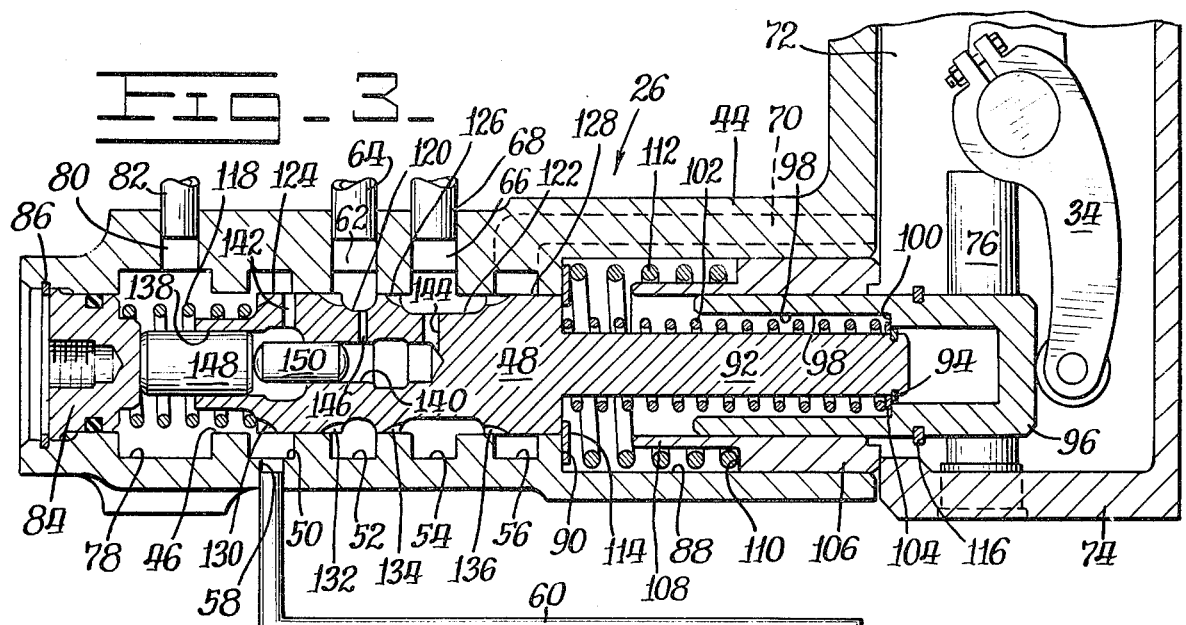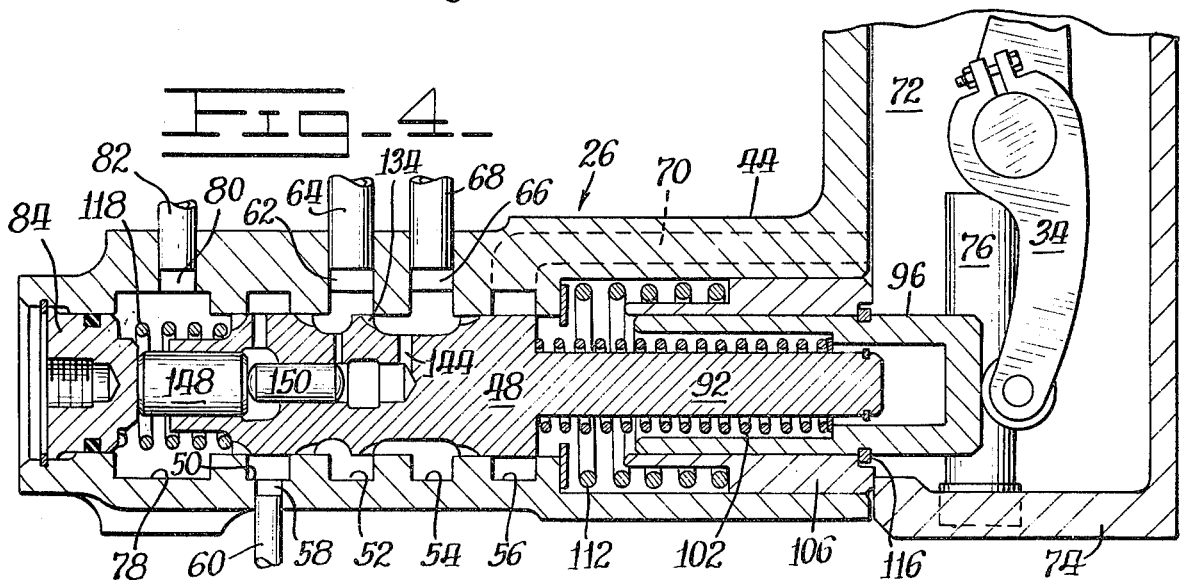

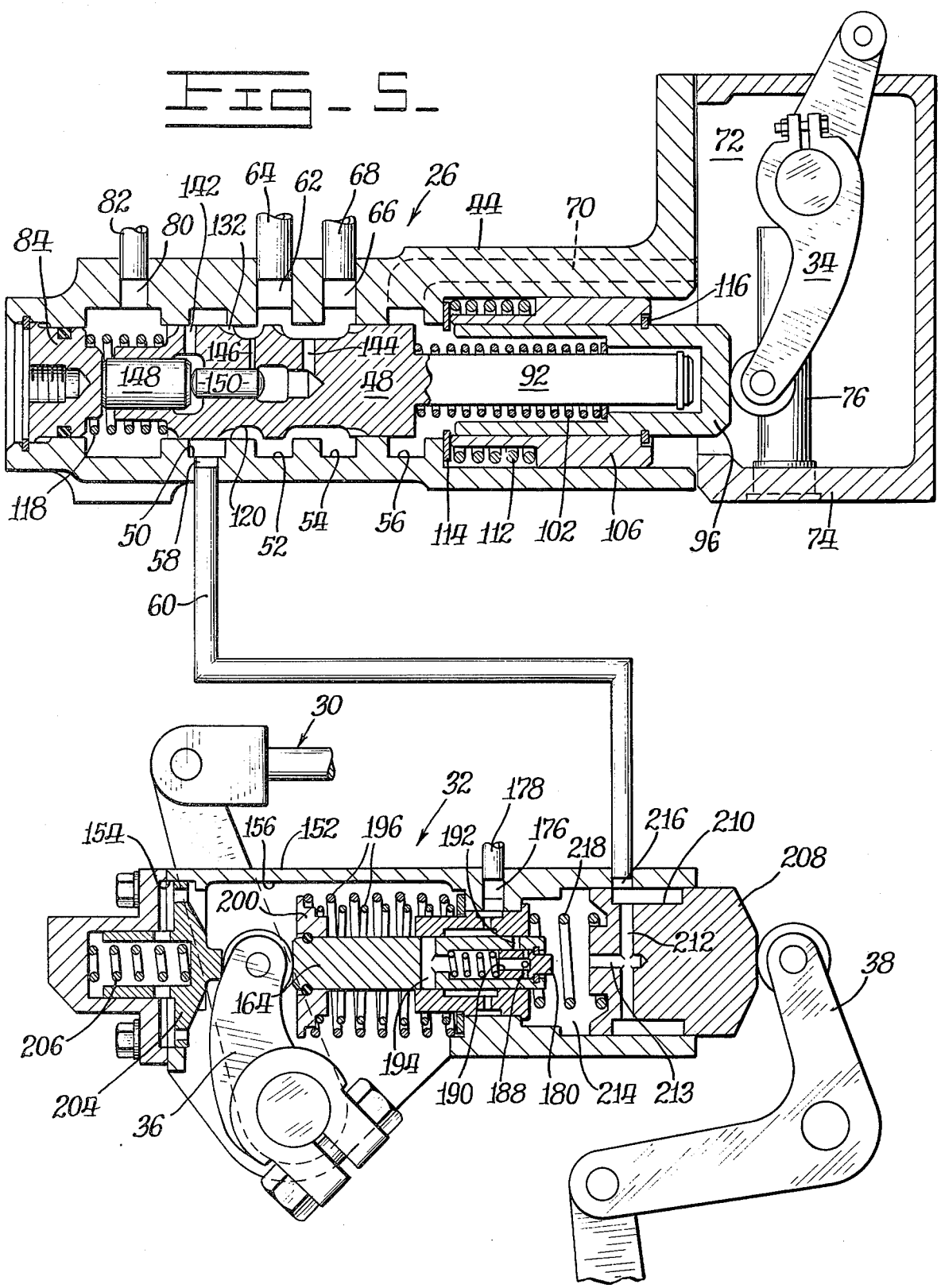

3,895,703

COMBINED STEERING CLUTCH AND BRAKE CONTROL FOR CRAWLER TRACTORS

BACKGROUND OF THE INVENTION

This invention relates to steering of tractors, and more paticularly, to the steering of tractors which include steering clutches and steering brakes.

In track-type tractors steering is accomplished by interrupting the drive to the drive wheel or sprocket on one side or the other of the tractor, and may be assisted by applying a brake selectively to the right or left of the drive components. In the past, control systems for steering through such means have been proposed in an effort to provide complete steering control through a single manual control element associated with each track. See, for example, U.S. Pat. No. 2,941,639 to Christenson et al, U.S. Pat. No. 3,262,525 to Ehlke et al (assigned to the assignee of this application), U.S. Pat. No. 3,374,846 to Massone, British Patent Specification No. 1,170,034 and British Patent Specification No. 1,218,526. Generally, each of these systems includes means for providing, through the movement of a single actuator member, the initial disengagement of a clutch and subsequent engagement of a brake associated therewith. In the case of U.S. Pat. No. 2,941,639, U.S. Pat. No. 3,374,846, and British Patent Specification No. 1,218,526, valve means are included to provide such sequential operation of the steering clutch and steering brake, while in the case of U.S. Pat. No. 3,262,525 and British Patent Specification No. 1,170,034, a lost-motion system is provided for achieving such sequential operation.

In general, these systems include a purely mechanical system for actuating the brakes thereof independently of the actuator member systen just described. That is, there is no teaching in any of these references of an independent system for applying brakes through the application of fluid pressure to means associated with said brakes. Rather, as pointed out above, each independent system disclosed in the above-mentioned patents relies on purely mechanical linkage means or the like to accomplish such result.

Of more general interest in this area are U.S. Pat. No. 2,845,818 to Siljander, U.S. Pat. No. 2,876,657 to Allin, Sr. et al, U.S. Pat. No. 2,876,659 to Richardson, U.S. Pat. No. 2,981,235 to Seddon, U.S. Pat. No. 2,989,986 to Schmitt (assigned to the assignee of this application), U.S. Pat. No. 3,187,845 to Ashley, Jr. et al, U.S. Pat. No. 3,305,037 to Stow, U.S. Pat. No. 3,369,460 to Ehlke et al, U.S. Pat. No. 3,348,563 to Sidles, Jr. and U.S. Pat. No. 3,448,841 to Sidles, Jr., (these last three patents assigned to the assignee of this application).

SUMMARY OF THE INVENTION

It is, therefore, an object of the present invention to provide, in a vehicle having steering clutches and associated steering brakes, actuator members which, through means associated therewith, sequentially effect disengagement of a steering clutch and then actuation of an associated steering brake.

It is a further object of this invention to provide, in a vehicle having steering clutches andd steering brakes, means independent of such actuating members for actuating a selected steering brake through the introduction of fluid pressure to means associated with the brake for actuation thereof.

It is a still further object of this invention to provide, in a vehicle having steering clutches and steering brakes, systems which, while fulfilling the above objects, are simple and relatively inexpensive in design.

Broadly stated, the invention is in combination with a vehicle in which driving force is applied to both sides thereof, such vehicle having clutch and brake systems associated respectively with both sides thereof and responsive to fluid pressure from a source thereof for steering of the vehicle. Each clutch and brake system associated with a side of the vehicle comprises brake means actuatable pressure thereto, application of fluid pressurethereto, to brake that side of the vehicle, and clutch means disengagable to disconnect driving force applied to that side of the vehicle upon application of fluid pressure thereto. Valve means are associated with the fluid pressure source and include a reciprocable valving spool positionable in a first position blocking fluid pressure from the brake means and clutch means and movable sequentially to second and third positions, the spool in the second position allowing fluid pressure from the source through the valve means to the clutch means to disengage the clutch means, but blocking fluid pressure from the brake means, the spool in its third position allowing fluid pressure from the source through the valve means to the clutch means to maintain the clutch means in its disengaged state, and allowing fluid pressure from the source through the valve means to the brake means for actuating the brake means. An actuating member is connected with the valving spool so that movement of the actuating member to first, second and third sequential positions moves the valving spool to its first, second and third sequential positions respectively. Further included are means independent of the valve means for selectively allowing fluid pressure from the fluid pressure source to the brake means, so that the brake means may be actuated with the clutch means in an engaged state.

BRIEF DESCRIPTION OF THE DRAWINGS

These and other objects of the invention will become apparent from a study of the following specification and drawings, in which:

FIG. 1 is a side elevation of a crawler tractor incorporating the invention;

FIG. 2 is a schematic view of the inventive system as shown in FIG. 1;

FIG. 3 is a sectional elevation of a portion of the inventive system, in a neutral position;

FIG. 4 is a sectional elevation of a portion of the inventive system, wherein the clutch means of the system have been brought into a disengaged state; and FIG. 5 is a sectional elevation similar to that shown in FIG. 3, wherein the clutch means are in a disengaged state, and wherein the brake means have been brought into an actuated state.

DESCRIPTION OF THE PREFERRED EMBODIMENT

Referring to the drawings, a combined steering clutch and brake control embodying the principles of the present invention is generally indicated by the reference numeral 10 as operatively associated with a track-type vehicle generally designated by the reference numeral 12. The vehicle 12 includes an elongated body 14 having an engine compartment 16 and an operator's compartment 18. The body 14 is supported and propelled by a pair of laterally spaced track assemblies 20, individually disposed on opposite sides of the vehicle body 14. Any suitable power train may drivingly connect the prime mover of the vehicle 12 to the track mechanism for propelling the vehicle 12. Such power train normally includes a cross-drive arrangement having a pair of normally engaged steering clutches and a pair of normally disengaged brakes disposed therein. One of the steering clutches and one of the brakes is provided for independent control of torque to one of the track assemblies 20, whereas the other steering clutch and brake is provided for independently controlling torque to the other track assembly 20. Since the steering clutches and brakes may be of any suitable type, the details of which are not pertinent to the instant invention, the details of the clutches and brakes are not shown herein and no further description is necessary for an understanding of this invention.

The combined steering clutch and brake control mechanism 10 includes a pair of actuating members in the form of hand control levers, one of which is illustrated at 22, which are individually connected by suitable actuating linkages such as that indicated generally at 24 to a pair of combined steering clutch and brake control valves, one of which is shown at 26.

A pair of brake pedals 28 are disposed in the operator's compartment 18 and are individually connected by suitable linkages indicated generally at 30 to a pair of brake servo valves, one of which is illustrated at 32. Since the pair of levers, linkages, valves and pedals for the opposite sides of the drive mechanism are substantially identical, only one set of these controls will be described with it being recognized that the other set of controls is constructed essentially the same and functions in identical manner thereto.

As is more clearly shown in FIG. 2, the linkage 24 terminates in a bellcrank 34 for actuation of the steering clutch and brake control vale 26. In a similar manner, the linkage 30 associated with pedal 28 terminates at its opposite end in a bellcrank 36 for actuation of the brake servo valve in the brake valve and cylinder 32. The output side of the brake servo valve and cylinder 32 is operatively associated with a bellcrank 38 which acts through a scissors linkage generally indicated at 40, to control engagement and disengagement of a brake 42.

Referring now to FIG. 3, valve 26 includes a body 44 having a longitudinal bore 46 extending therethrough for slidably and reciprocably housing a valving control spool 48. A plurality of annular grooves 50, 52, 54, 56 are disposed in longitudinally spaced circumscribing relation to bore 46. A brake port 58 communicates between annular groove 50 and a line 60 communicating with brake servo valve and actuating cylinder 32 for a purpose to be hereinafter described. An inlet port 62 communicates between annular groove 52 and a line 64 for communication between a suitable source of fluid under pressure and the bore 46 in the valve body 44. A clutch port 66 communicates between annular groove 54 and a line 68 for selective communication of pressurized fluid to a clutch actuator, not shown. A passage 70 communicates between annular groove 56 and a chamber 72 defined in part by one end of valve body 44 and a valve actuator housing 74 which encloses the output end of the bellcrank 34. A hollow standpipe 76 is secured in the lower wall of housing 74 and extends upwardly in chamber 72 to a level above the valve elements.

An annular groove 78 is disposed in circumscribing relation around the bore 46 adjacent an outer end thereof and communicates by way of a drain port 80 and a line 82 with an oil storage reservoir (not shown). The outer end of bore 46 adjacent annular groove 78 is closed and sealed by a plug 84 which is retained by a snap ring 86.

The opposite end of bore 46 coaxially connects with an enlarged bore 88 to define a shoulder 90 therebetween. Spool 48 includes a reduced diameter extension 92 which is essentially concentrically coextensive with enlarged bore 88. A snap ring 94 is provided adjacent the outer free end of extension 92. An actuating plunger 96 having a stepped bore 98 therein defining a shoulder 100 is disposed in telescopic relation over the extension 92 of the spool 48. A spool biasing spring 102 is disposed in telescopic relation over the extension 92 so as to have load bearing engagement between the end of the spool 48 and a washer 104 which engages the shoulder.

An adapter sleeve 106 includes a reduced diameter annular extension 108 defining a shoulder 110. The adapter sleeve 106 is slidably mounted in the enlarged bore 88 in telescopic concentric relation to the actuating plunger 96. A brake feel spring 112 is disposed between the shoulder 110 and a spring retaining washer 114 which engages the shoulder 90 defining the intersection of bore 46 with enlarged bore 88.

A snap ring 116 engages a suitable groove in the outer diameter of actuating plunger 96 and is adapted for selective engagement with the outer end of adapter sleeve 106 to cause inward movement of the adapter sleeve 106 and compression of spring 112 as the actuating plunger 96 is moved inwardly past a predetermined point.

A spring 118 is disposed between the plug 84 and the end of the spool 48 opposite extension 92 to provide a biasing force in opposition to the spring 102.

Spool 48 includes a pair of annular grooves 120, 122 defining a plurality of lands 124, 126, 128 which cooperate with the annular grooves 50, 52, 54, 56 to control the flow of pressurized oil through the valve 26. The lands 124, 126, 128 respectively include metering slots 130, 132, 134, 136. The end of the spool 48 adjacent the plug 84 includes a relatively large bore 138 opening to the outer end of the spool 48, with the inner end of the bore 138 intersecting a coaxial, relatively small diameter blind bore 140 which terminates in generally radial alignment with the annular groove 122. A passage 142 communicates between the outer surface of the land 124 and the inner end of the bore 138. A passage 144 communicates between annular groove 122 and the inner end of bore 140, with a passage 146 communicating between annular groove 120 and the intermediate portion of bore 140.

A relatively large diameter spool or piston 148 is sealingly, reciprocably and slidably fitted in the bore 138 for abutment at its outer end with the plug 84. A smaller diameter spool or piston 150 is sealingly, reciprocably and slidably fitted in bore 140 in abutting relation with the inner end of piston 148.

As previously described, the line 60 communicates annulus 50 of valve 26 with the brake servo valve and actuating cylinder 32. The brake servo valve 32 includes a body or cylinder 152 having a plurality of coaxial bores 154, 156, 158, 160, 162 coaxially aligned and serially connected therethrough. Bellcrank 36 has its output arm extending upwardly into the chamber formed by the bore 156 for engagement with a plunger 164. The plunger 164 is slidably mounted in a bore 166 of an adapter sleeve 168 which is rigidly mounted in the bore 158. The sleeve 168 includes an external annular groove 170 which communicates through a plurality of radial ports 172 with an annular groove 174 formed in the bore 166. The groove 170 also communicates with an inlet port 176 which communicates via a line 178 with a suitable source of fluid pressure.

A valve spool 180 is slidably mounted in a bore 182 of plunger 164 and is biased outwardly thereof by a spring 184 into contact with a snap ring 186. A plurality of radial ports 188 communicate between a bore 190 of spool 180 and the outer periphery of the spool 180 for selective communication with a plurality of radial ports 192 which communicate with the bore 182 of plunger 164. The inner end of the bore 182 communicates with a cross-passage 194 in the plunger 164.

The plunger 164 is biased to the left as viewed in the drawings by a pair of springs 196, one end of which engage a spring retaining washer 198 with the outer end thereof engaging a spring retainer 200 secured to the leftward end of plunger 164 by a snap ring 202. A stop member 204 is slidably disposed in the bore 154 and is biased by a spring 206 for resilient engagement with the output end of bellcrank 36 to absorb rebound energy as it returns to a brake release position as shown in FIG. 3.

A brake actuating servo piston 208 is reciprocably and slidably disposed in the bore 162 and has one end projecting outwardly therefrom for engagement with the free end of bellcrank 38 for selective actuation of the brake 42. The piston 208 includes an annular groove 210 around the outer periphery thereof with passages 212, 213 communicating between the annular groove 210 and a variable volume chamber 214 defined by the piston 208, cylinder 152, and the brake servo valve. Groove 210 is disposed on piston 208 so as to be in constant communication with an inlet port 216 to which the line 60 is connected to provide fluid communication from the valve 26 to the annular groove 210 and thence to chamber 214. A spring 218 is provided in the chamber 214 to bias the piston 208 outwardly to balance forces in the system urging the piston inwardly to minimize fill time for chamber 214 and improve control response.

OPERATION

In operation, fluid under pressure is supplied through line 64 and port 62 to the annular groove 52 in body 44 of the valve 26. When spool 48 is in a neutral or first position, the fluid pressure in groove 52 is communicated by way of annular groove 120, passage 146, bore 140, passage 144, and metering slots 136 to groove 56 where it is communicated by way of passage 70 to the chamber 72. This is effective to fill the chamber 72 to the top of the standpipe 76 so that the oil supplied to the chamber 72 is communicated through the standpipe 76 to a bevel gear case, not shown, for lubrication of the bevel gear shaft bearings during operation. With the spool 48 in this first position, communication is blocked between the inlet port 62 and the clutch port 66, as well as between the inlet port 62 and the brake port 58. The clutch port 66 is also communicated by way of the slots 136 and the passage 70 with the chamber 72 to insure that the clutch actuator is not pressurized. In a similar manner, the brake port 58 is communicated by way of the annular groove 50, bore 46, and annular groove 78 to drain port 80, and thence to tank by way of line 82 to insure complete release of the brake 42.

Operation of hand control lever 22 to a second sequential or clutch disengaging position is effective to move the plunger 96 leftward as viewed in the drawings to urge spool 48 to a respective second or clutch disengaging position as best illustrated in FIG. 4. With the spool in this position, the clutch port 66 is isolated from the annular groove 56 and passage 70 to permit fluid pressure to be applied to the clutch actuator. For this purpose, inlet port 62 is communicated by way of the slots 134 to the groove 54 and then the port 66 and the line 68 to the clutch for release thereof. At this time, communication between the inlet port 62 and the brake port 58 is still blocked with the metering slots 130 maintaining communication between the brake port 58 and the drain port 80.

This permits the operator to relieve the clutch on one side of the vehicle without engagement of the brake to provide a gradual turn of the vehicle 10 by interrupting the drive to that respective track 20. The pressure in the clutch is modulated by communication of the actuating pressure to the bore 140 through the passages 144 and 146. The pressure in the bore 140 acts between the piston 150 and the end of the bore 140 in opposition to spring 102 for positioning spool 48 and controlling the clutch pressure proportional to the compression of the spring 102.

When it is desired to reduce the turn radius for a sharper turn of the vehicle 10, the control lever 22 is moved to a third sequential or brake engaged position which urges the plunger 48 farther to the left at which point the snap ring 116 will engage the end of the adapter sleeve 106 to provide additional resistance to movement of the control lever 22 and signal the operator that he is going into the brake engaging position. Thus, the movement of the actuating member 22 from its first to its second position is resisted at a first spring rate, and the movement of the actuating member 22 from its second to its third position is resisted at a second spring rate higher than the first spring rate.

Upon further compression of the spring 102 the spool is urged leftward to a respective third position for disengagement of the clutch and engagement of the brake which is more clearly shown in FIG. 5. This is accomplished by maintaining the previously described communication between the inlet port 62 and the clutch port 66 to maintain the clutch in a disengaged position. This position of spool 48 also communicates the inlet port 62 by way of the annular groove 120 and the slots 132 with the annular groove 50, brake port 58, and line 60 to communicate fluid pressure to the inlet port 216 of the brake servo valve and cylinder 32. The pressure in the port 216 is communicated through annular groove 210 and passages 212 and 213 to chamber 214. Since the spool 180 is in a closed position, the pressurization of chamber 214 urges the piston 208 rightwardly as shown in the drawings to actuate bellcrank 38 toward a brake-engaged position. This engages the brake 42 to retard rotation of the drive line to that respective track 20 and thus decrease the turning radius of the machine 10. Communication of pressure to bore 140 by way of the passage 142 for action on piston 148 controls the spool position to modulate brake pressure in proportion to compression of the spring 102.

When it is desired that the vehicle 10 again travels in a straight line, the control lever 22 is released, whereby the spool 48 will return to the neutral position as shown to block communication between inlet port 62 and the clutch and brake ports 66, 58, respectively. The communication of lube oil to the chamber 72 is again provided as previously described. The brake actuating chamber 214 is again communicated to the reservoir by way of the line 60, annular grooves 50, 78, and line 82, as previously described. The spring 218 allows the piston 208 to return only the amount necessary for full release of the brakes 42, thus avoiding excessive cavitation of the chamber 214 and insuring immediate response on brake engagement.

Should the operator desire to engage one or both of the brakes without disengaging the clutch, this is accomplished by actuating bellcrank 36 in a clockwise direction in response to actuation of the foot pedal 28. This rotation of the bellcrank 36 moves the plunger 164 to the right to engage the outer end of the spool 180 with the inner face of the piston 208. This blocks the passage 213 and stops the spool 180. Continued movement of the plunger 164 communicates fluid pressure from the inlet port 216 through the adapter sleeve, to the passage 194 in the plunger 164, the bore 190, the radial ports 188 in spool 180, and the ports 192 in the plunger to the chamber 214 within the cylinder 152 to urge the piston 208 rightwardly and as previously described to engage the brake 42. Release of the foot pedal 28 allows the springs 196 to urge the bellcrank 36 in a counterclockwise direction and thus permit the plunger 164 to return to the position shown. This communicates the chamber 24 to the tank port 80 in the valve 26 by way of passages 213, 212, the groove 210 and line 60 to vent the pressure from the brake-actuating cylinder. Operation of both pedals 28 is effective to operate both brakes as described above.

What is claimed is:

1. In combination with a vehicle in which driving force is applied to both sides thereof, clutch and brake systems associated respectively with both sides thereof and responsive to fluid pressure from a source thereof for steering of the vehicle, each clutch and brake system associated with a side of the vehicle comprising:
   clutch means disengageable to disconnect the driving force applied to that side of the vehicle upon application of fluid pressure thereto;
   brake means actuatable upon application of fluid pressure thereto to brake that side of the vehicle;
   valve means associated with said fluid pressure source and including a reciprocable valving spool positionable in (i) a first position blocking fluid pressure from said clutch means and said brake means and movable sequentially to (ii) second and (iii) third positions, said spool in said second position allowing fluid pressure from said source through said valve means to said clutch means to disengage said clutch means, but blocking fluid pressure from said brake means, said spool in said third position allowing fluid pressure from said source through said valve means to said clutch means to maintain said clutch means in its disengaged state and allowing fluid pressure from said source through said valve means to said brake means for actuating said brake means;
   an actuating member connected with said valving spool so that movement of the actuating member to first, second and third sequential positions moves the valving spool to its first, second and third sequential positions respectively; and
   means independent of said valve means for selectively allowing fluid pressure from said fluid pressure source to said brake means, so that the brake means may be actuated with the clutch means in an engaged state.

2. The system of claim 1 and further comprising first and second resilient means resisting the movement of the actuating member from its first position to its second position at a first spring rate, and second resilient means resisting the movement of the actuating member from its second to its third position at a second spring rate higher than said first spring rate.

3. The system of claim 2 wherein the brake means comprise a cylinder, a piston reciprocable therein, a brake, and linkage means interconnecting the piston and brake so that application of fluid pressure within the cylinder moves the piston to apply the brake through the linkage means.

4. The system of claim 3 wherein the means independent of said valve means for selectively allowing fluid presssure from said fluid pressure source to said brake means comprise means for allowing fluid pressure from said source to the piston within the cylinder.

5. The system of claim 1 wherein the brake means comprise a cylinder, a piston reciprocable therein, a brake, and linkage means interconnecting the piston and brake so that application of fluid pressure to the piston within the cylinder moves the piston to apply the brake through the linkage means.

6. The system of claim 5 wherein the means independent of said valve means for selectively allowing fluid pressure from said fluid pressure source to said brake means comprise means for allowing fluid pressure from said source to the piston within the cylinder.

7. The system of claim 6 wherein the means independent of said valve means for selectively allowing fluid pressure from said fluid pressure source to said brake means further comprise a foot pedal.

* * * * *